United States Patent [11] 3,620,929

| [72] | Inventors | Ehrenfried H. Kober |
| | | Hamden; |
| | | Wilhelm J. Schnabel, Branford, both of Conn. |
| [21] | Appl. No. | 772,417 |
| [22] | Filed | Oct. 31, 1968 |
| [45] | Patented | Nov. 16, 1971 |
| [73] | Assignee | Olin Corporation |

[54] PROCESS FOR SEPARATING ORTHO-ISOMERS FROM TOLYLENE DIISOCYANATE MIXTURES
5 Claims, No Drawings

[52] U.S. Cl. ................................................... 203/38, 203/59, 260/309.2, 260/453 PH, 260/453 SP
[51] Int. Cl. ............................................. B01d 3/34, C07c 119/04
[50] Field of Search ............................................ 260/453 A-453 P, 453 SP; 203/38

[56] References Cited
UNITED STATES PATENTS

| 3,140,305 | 7/1964 | Lowenstein .................. | 260/453 |
| 3,246,035 | 4/1966 | Forman et al. ................ | 260/453 X |
| 3,282,975 | 11/1966 | Friedman et al. ............. | 260/453 |
| 3,462,470 | 8/1969 | Emery et al. ................. | 260/453 |

Primary Examiner—Alex Mazel
Assistant Examiner—Dolph H. Torrence
Attorneys—Ellen P. Trevors, Richard S. Strickler, Robert H Bachman, Donald R. Motsko and Thomas P. O'Day ABSTRACT: Removal of ortho-isomers from tolylene diisocyanate mixtures is effected by reacting said mixtures with a primary aromatic amine and subsequently distilling to recover nonvicinal tolylene diisocyanate.

PROCESS FOR SEPARATING ORTHO-ISOMERS FROM TOLYLENE DIISOCYANATE MIXTURES

This invention relates to an improved process for the preparation of tolylene diisocyanate. More particularly, this invention relates to a process for removing ortho-isomers of tolylene diisocyanate from tolylene diisocyanate reaction mixtures.

Tolylene diisocyanate is a commercially available material particularly useful in the preparation of polyurethane foams. Although tolylene diisocyanate can be prepared by a variety of methods, commercial processes prefer phosgenation of tolylene diamines as a practical route to the corresponding diisocyanates. Thus, a mixture of tolylene diamines is dissolved in an inert solvent and reacted with phosgene at elevated temperatures to provide the desired diisocyanates. The resulting reaction mixture is then purged to remove excess phosgene and gaseous byproducts prior to recovering the tolylene diisocyanates by distillation.

While providing the desired tolylene diisocyanate, the aforementioned process has presented problems in commercial operations which previous researchers have attempted to define and obviate. Thus, it has been recognized that the presence of ortho-isomers of tolylene diamine in the starting material yields cyclic ureas, thereby contaminating the product and decreasing the yield. U.S. Pat. No. 3,317,606 discloses a method for separating these ortho- , or vicinal tolylene diamines from the nonvincinal isomers by an extraction technique.

Recently, it has been established that the formation of turbidity in tolylene diisocyanate is caused by the presence of ortho-isomers of tolylene diisocyanate, which polymerize to insoluble, haziness producing materials. Thus, in the aforementioned commercial process, the tolylene diamines which are phosgenated generally contain some of the ortho-isomers. Removal of the ortho-isomers from tolylene diamine is costly and presents an economic detriment to commercial operations.

Therefore, formation of turbidity is a major quality problem encountered in commercial tolylene diisocyanates, and there is a need for efficiently and economically eliminating the formation of this turbidity. It will be readily appreciated that this problem, which occurs with disturbing frequency in many manufacturing processes, is a serious detriment to commercial operations wherein storage of the tolylene diisocyanate prior to use is essential.

Now it has been found in accordance with this invention that the problem of turbidity in tolylene diisocyanate can be eliminated by treating tolylene diisocyanates containing ortho-isomers, or polymers thereof, with a primary aromatic amine, followed by distillation, to recover tolylene diisocyanates essentially free from ortho-, or vicinal, isomers. This process is readily adaptable to commercial operations and obviates the requirement of special equipment or costly materials.

While it is apparent that any mixture containing ortho-isomers of tolylene diisocyanate can be treated in accordance with this invention, the aforementioned commercial process wherein tolylene diamines are phosgenated to the corresponding diisocyanates is readily adaptable to the process described herein.

More in detail, it has been determined that the primary aromatic amines described herein react with the ortho-isomers of tolylene diisocyanate to provide undistillable products from which the meta-tolylene diisocyanates are readily separated by distillation. For example, mono-functional primary aromatic amines react with o-tolylene diisocyanates to provide cyclic biurets in accordance with the following general equation wherein R is an aryl radical.

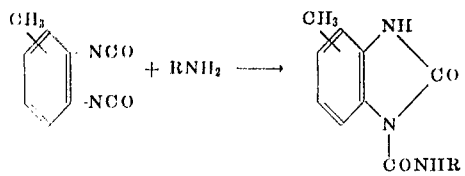

It will be apparent to those skilled in the art that polyfunctional aromatic amines also will form biurets, or complex addition products from which the meta-tolylene diisocyanates are easily removable.

Of course, it is recognized that the primary aromatic amines may react with meta-tolylene diisocyanates to form ureas; however, such ureas are readily cleaved during the distillation step or by heating prior to distillation, to reform the corresponding meta-tolylene diisocyanates and the primary aromatic amines. These amines in turn react with the ortho-tolylene diisocyanates to form cyclic biurets which are not cleaved during these operations and remain undistillable.

Primary aromatic amines suitable for use in the process of this invention are the monofunctional and polyfunctional amines having a total of 6–13 carbon atoms. Illustrative monoamines include aniline, the toluidines, the xylidines, naphthyl amines, etc. Representative of the polyamines are the phenylene diamines; the tolylene diamines; the naphthylene diamines; diamino-anisol; the amino bis-phenyl ethers; condensation products of amines with formaldehyde, e.g. 4,4'-methylenedianiline; 4,4'-diamino diphenyl sulfone; etc.

While any of the aforementioned primary aromatic amines can be suitably employed in the process of this invention, preferred embodiments employ mononuclear primary aromatic amines, and particularly the monoamines and diamines.

Generally, the primary aromatic amine is employed in an amount between about 0.5 and about 10 mole equivalents per mole of ortho-tolylene diisocyanate. However, lesser amounts can be employed if desired, and greater amounts can be employed where cost is not a factor.

After incorporating the primary aromatic amine with the tolylene diisocyanate, the resulting mixture is distilled to remove the nonvicinal tolylene diisocyanates. The reaction to provide the nondistillable biurets occurs prior to and during the distillation step. If desired, the mixture of tolylene diisocyanate and primary aromatic amine can be heated prior to distillation; where this technique is employed, temperatures in the range of about 100–250° C. are utilized.

The following examples will serve to illustrate the removal of ortho-isomers from tolylene diisocyanate mixtures in accordance with the practice of this invention.

EXAMPLE I

Tolylene diamine comprising about 94 percent meta- and about 4 percent ortho-tolylene diamines was dissolved in o-dichlorobenzene and charged to a reactor. After continuous phosgenation at 125°–130° C. for about 2.5 hours, the reaction mixture was fed to a purge column. The excess phosgene and hydrogen chloride byproduct were purged with nitrogen and the o-dichlorobenzene solvent removed by distillation. The bottoms were fed to an evaporator stripper and tolylene diisocyanate was removed by distillation at 180° C./20 mm. Hg, thereby insuring the retention in the distillation residue of any byproducts formed during the phosgenation of the tolylene diamine.

A 0.50 ml. sample of the distillate was withdrawn and analyzed for ortho-isomers of tolylene diisocyanate by conversion to methylbenzimidazolones in the following manner. The sample was hydrolyzed with 15 ml. of concentrated hydrochloric acid at 180° C. in a pressure tube, and the resulting tolylene diamine hydrochlorides removed by cation exchange. Ultraviolet spectroscopy of the eluant in a 3:1 isopropanol-water medium revealed a methylbenzimidazolone content of 0.26 percent corresponding to 0.30 percent by weight of ortho-tolylene diisocyanates.

Another sample, in the amount of 100 g., was withdrawn from the distillate, placed in a 3-necked flask and mixed with 0.2 g. of aniline. Distillation at 170°–180° C./20 mm. Hg pro-

EXAMPLE III

Example II was repeated with the additional step of heating the mixture of tolylene diisocyanates and tolylene diamine at vided tolylene diisocyanate having an ortho-isomers content of 0.07 percent by weight as determined by hydrolysis to methylbenzimidazolones.

Infrared analysis of a sample of the distillation residue revealed absorption at 3.12, 3.24, 5.80, 5.86, 7.4μ corresponding to the absorption of pure tolylene-allophanoyl-anilide, prepared by reaction of pure 2,3- and 3,4- tolylene diisocyanate with aniline. The residue showed no infrared absorption at 6.1 μ, the characteristic peak of ureas prepared from 2,4- and 2,6- tolylene diisocyanate and aniline, indicating that no loss of 2,4- or 2,6- tolylene diisocyanate occurred.

For purposes of comparison, a sample of the original distillate was distilled at 170°–180° C./20 mm. Hg without treatment with aniline; the ortho-isomer content of this distillate was about 0.20 percent by weight.

EXAMPLE II

Following the procedure of Example I, a 100 g. sample of a tolylene diisocyanate mixture containing 0.30 percent by weight of ortho-isomers was treated with 0.25 g. of 2,4-tolylene diamine and distilled at 170°–180° C./20 mm. Hg. to provide tolylene diisocyanate having an ortho-isomers content of 0.14 percent by weight.

170° C. for 3 hours prior to distillation. Flash distillation at 100°–125° C./0.5 mm. Hg. gave tolylene diisocyanate containing 0.10 percent by weight of o-tolylene diisocyanates.

What is claimed is:

1. A process for removing ortho-isomers of tolylene diisocyanate from a tolylene diisocyanate mixture containing said ortho-isomers along with nonvicinal tolylene diisocyanates, which process comprises incorporating in said mixture from about 0.5 to about 10 moles, per each mole of said ortho-isomers, of a primary aromatic amine having 6 to 13 carbon atoms and selected from the group consisting of aniline, the toluidines, the xylidines, the naphthyl amines, the phenylene diamines, the tolylene diamines, the naphthylene diamines, diaminoanisol, the amino bis-phenyl ethers, 4,4'-methylene dianiline, and 4,4'-diamino diphenyl sulfone, and distilling said mixture thereby recovering, as distillates, nonvicinal tolylene diisocyanates.

2. The process of claim 1 wherein a mononuclear primary aromatic amine is employed.

3. The process of claim 2 wherein aniline is employed as the mononuclear primary aromatic amine.

4. The process of claim 2 wherein tolylene diamine is employed as the mononuclear primary aromatic amine.

5. The process of claim 1 wherein said mixture is heated at a temperature from about 100° to about 250° C. prior to distillation.